Figures 1, 2, 3:
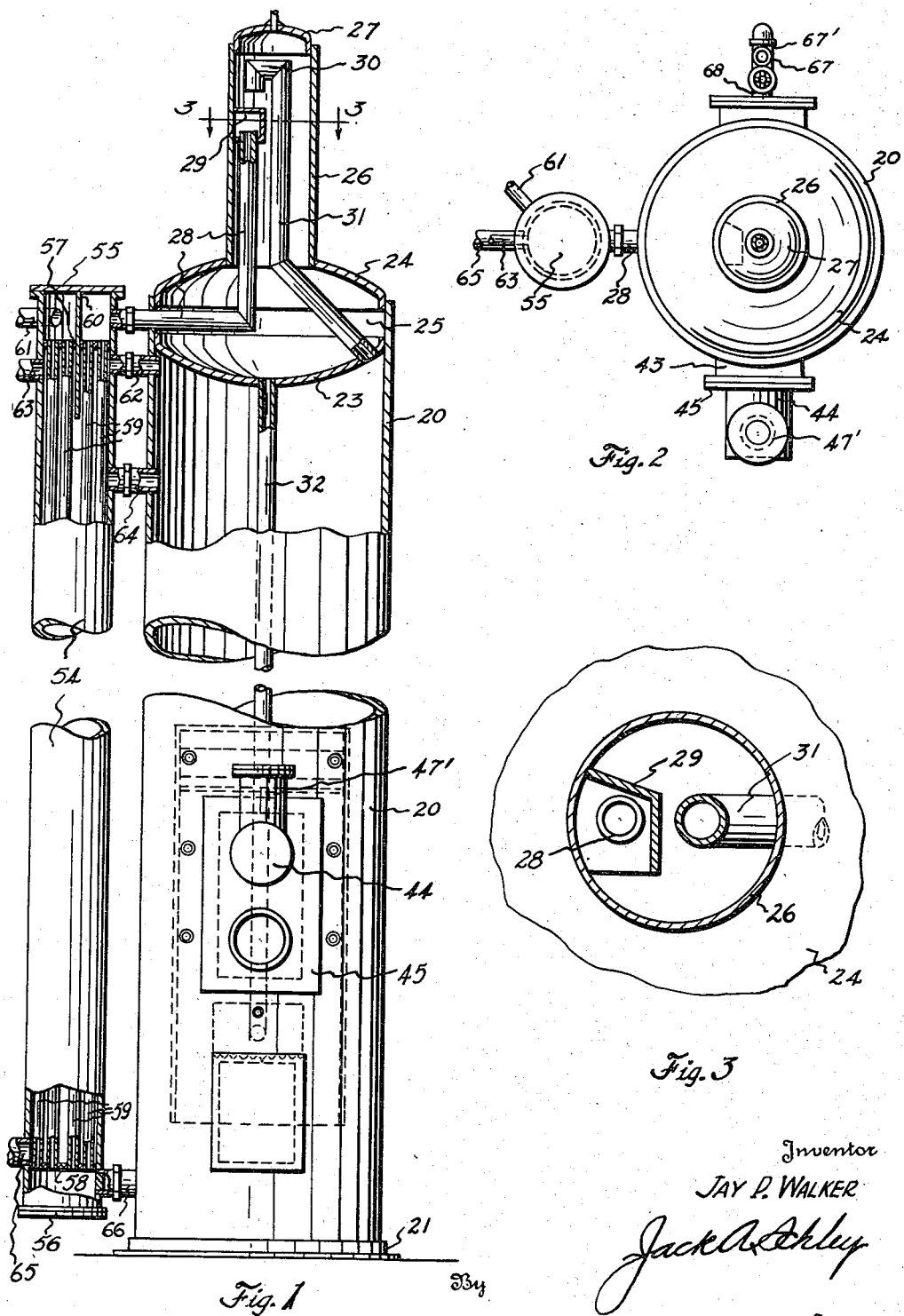

Nov. 28, 1939.   J. P. WALKER   2,181,685
TREATMENT OF OIL, GAS, AND WATER EMULSIONS
Filed Sept. 14, 1936   6 Sheets-Sheet 1

Inventor
JAY P. WALKER
By Jack A. Ashley
Attorney

Inventor
JAY P. WALKER

Nov. 28, 1939.   J. P. WALKER   2,181,685
TREATMENT OF OIL, GAS, AND WATER EMULSIONS
Filed Sept. 14, 1936   6 Sheets-Sheet 4

Inventor
JAY P. WALKER
By Jack A. Ashley
Attorney

Nov. 28, 1939.  J. P. WALKER  2,181,685
TREATMENT OF OIL, GAS, AND WATER EMULSIONS
Filed Sept. 14, 1936   6 Sheets-Sheet 5
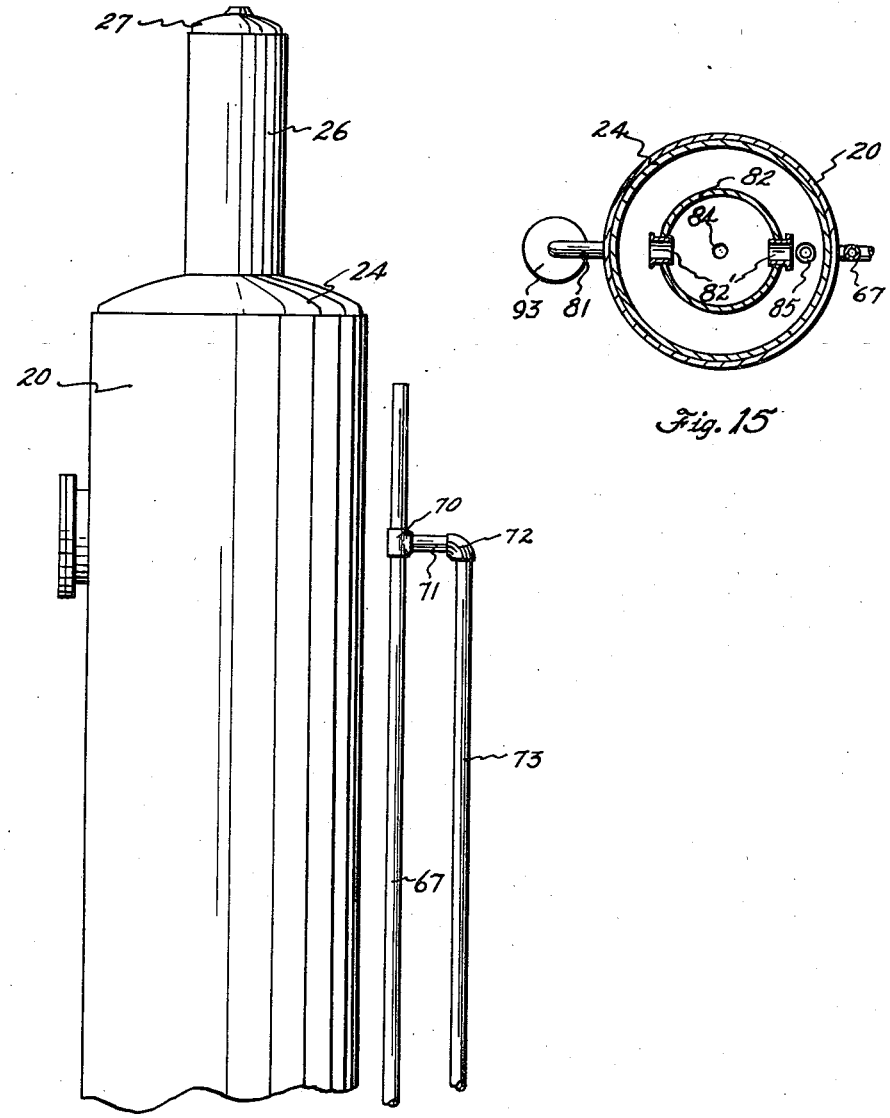
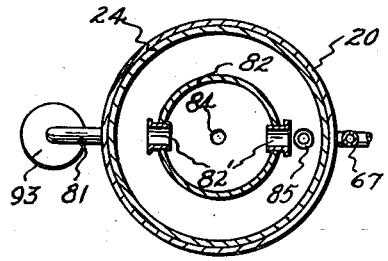
Fig. 15
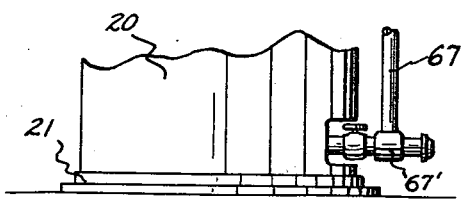
Fig. 12
Inventor
JAY P. WALKER
By Jack A. Ashley
Attorney Patented Nov. 28, 1939

2,181,685

UNITED STATES PATENT OFFICE 2,181,685

TREATMENT OF OIL, GAS, AND WATER EMULSIONS

Jay P. Walker, Tulsa, Okla., assignor of forty per cent to Guy O. Marchant and six per cent to C. G. Wells, Tulsa, Okla.

Application September 14, 1936, Serial No. 100,655

14 Claims. (Cl. 183—2.7)

This invention relates to new and useful improvements in the treatment of oil, gas and water emulsions.

This application is filed as a continuation in part of my pending application Serial No. 13,675, filed March 29, 1935.

In the majority of fields where oil and gas are being produced, the producing formations, whether they be of porous limestone or porous sandstone, are usually partially filled with salt water, mostly found in the outer or lower lying edges of the area or field structure proper, and in some cases, the water may be found to underlie the entire field when it first becomes productive; and some wells when originally drilled into the pay formation, may produce salt water at once with the oil and gas. The encroachment of said salt water during the life of most oil fields is almost certain, and on account of there being no practical method yet devised for separately producing the oil, gas and water directly from the wells, these three mediums are prone to come from such wells as an emulsion.

It is commonly stated that it takes these three mediums produced together to make an emulsion, and it is also true that it is not usual for oil and water to mix as an emulsion unless gas is present or unless the oil-water mixture is being produced by artificial means, such as air or gas injected into the well under pressure, producing what is known as an air or gas lift. Emulsions occurring from this latter method are usually of a very close or intimate nature and are ordinarily quite difficult to treat. Ordinarily, they may not be treated without the use of heat or chemicals, or both, and sometimes at great expense.

Sometimes oil and gas and certain mineral waters or hydrogen sulphide gases are produced with the water, and in these cases the ordinary treating methods of heat and chemical become very expensive; and it is generally known that the higher the temperatures required for treating, the more of the light and valuable gases are lost to atmosphere; and thus the treating process is not only expensive, but wasteful of the resource to be treated. These losses occur through vaporization and evaporation, by heating of the lighter and higher volatiles which go to make up the gravity of the oil, and which when saved become gasoline, a very valuable by-product of crude oil.

It is, therefore, one of the objects of this invention to provide a method for handling or treating substantially any grade of emulsion with minimum losses of desirable gaseous fluids, due to heating excessively; whereby the gravity of the oil is maintained and also for reducing the amount of chemical used and possibly doing away with its use entirely, thus effecting a considerable saving in both fuel cost and chemical expense.

Another object of the invention is to cool both the oil and the gases rising from the oil after the heat treatment and the precipitation of the water from the oil. By cooling the gases rising from the hot oil, the more volatile gases are condensed and the condensate, such as gasoline, may thus be put back into the oil. This tends to restore the cool oil to its original gravity and defeats loss of valuable gaseous constituents.

A further object of the invention is to effect a primary separation of the free gases and gas in solution from the emulsion, under the best conditions, by the separation at or near atmospheric pressure, of the major portion of such gas, prior to passing the emulsion through the heating zone. It is well known (Bureau of Mines, bulletin No. 379) that when gas is heated either while in solution in oil or free from oil, it will expand many more times in volume than when under 60 degrees Fahrenheit, or even at atmospheric temperatures. The gas expansion being more extensive than that of oil and much more than that of water, it occupies more space when heated and causes greater agitation; thus, as will be shown, the time element for heat exchange is minimized. All of this makes successful treatment of the emulsion extremely difficult and in some instances impossible. As the emulsion will lose much of its valuable liquefiable gases by vaporization and evaporation due to heat, particularly at atmospheric pressures and temperatures, the gases may be readily separated, but the liquid content should be conserved. By reducing the gas content, so as to produce as near as possible a water-oil mixture, the treating may be carried out at a reduced temperature without undue agitation and more expeditiously. The primary removal of the gas and its subsequent remixing with the hot gas thereby cooling said hot gas to assist condensation of the higher volatiles of said gas, whereby these volatiles are dropped and mixed with the oil making an ideal treating method.

Still another object of the invention is to provide in and around the heating zone means for elongating and prolonging the travel path of the emulsion, together with means for spreading the emulsion and dividing it into numerous small streams, which reduces surface tension of the oil and enhances the precipitation of the water.

A further object of the invention is to provide a thermo-syphon system whereby the water is recirculated and reheated. This is particularly advantageous when a well is producing much oil and very little water; also the return flow of the heated water acts to insulate the heating zone against outside cold temperatures. This system causes the recirculated hot water to be admixed with the incoming oil and water mixture, thus reducing the degree of heat necessary to treat the emulsion. Another advantage of the thermo-syphon is the breaking up of accumulations of extraneous hydrocarbon solids, whereby more efficient treatment is performed.

An important object of the invention is to preheat the influent by heat exchange or otherwise, whereby the primary gas separation is more readily effected and less heat is required to heat the emulsion; and also whereby the oil and gas are cooled after the water is precipitated.

A further object of the invention is to provide a separating chamber or surge tank at the upper portion of the separator, which may vary in size according to the well conditions, for receiving the influent, either before or after it is preheated, whereby a volume of oil and water may be collected and fed to the water and oil separating unit as desired, or whereby merely a separation of the gas may be carried out and the oil and water mixture conducted to the water precipitating unit without control.

Still another object of the invention is to provide a container above the oil level having its bottom exposed to the hot gases rising from the heated oil, so that cooler liquids in the container will cause a heat exchange when the hot gases contact said bottom, thereby condensing said gases before they escape from the separator tank which permits the higher volatiles to be dropped and mixed with oil to raise the specific gravity.

A construction designed to carry out the invention will be hereinafter described, together with other features of the invention.

Figure 4:
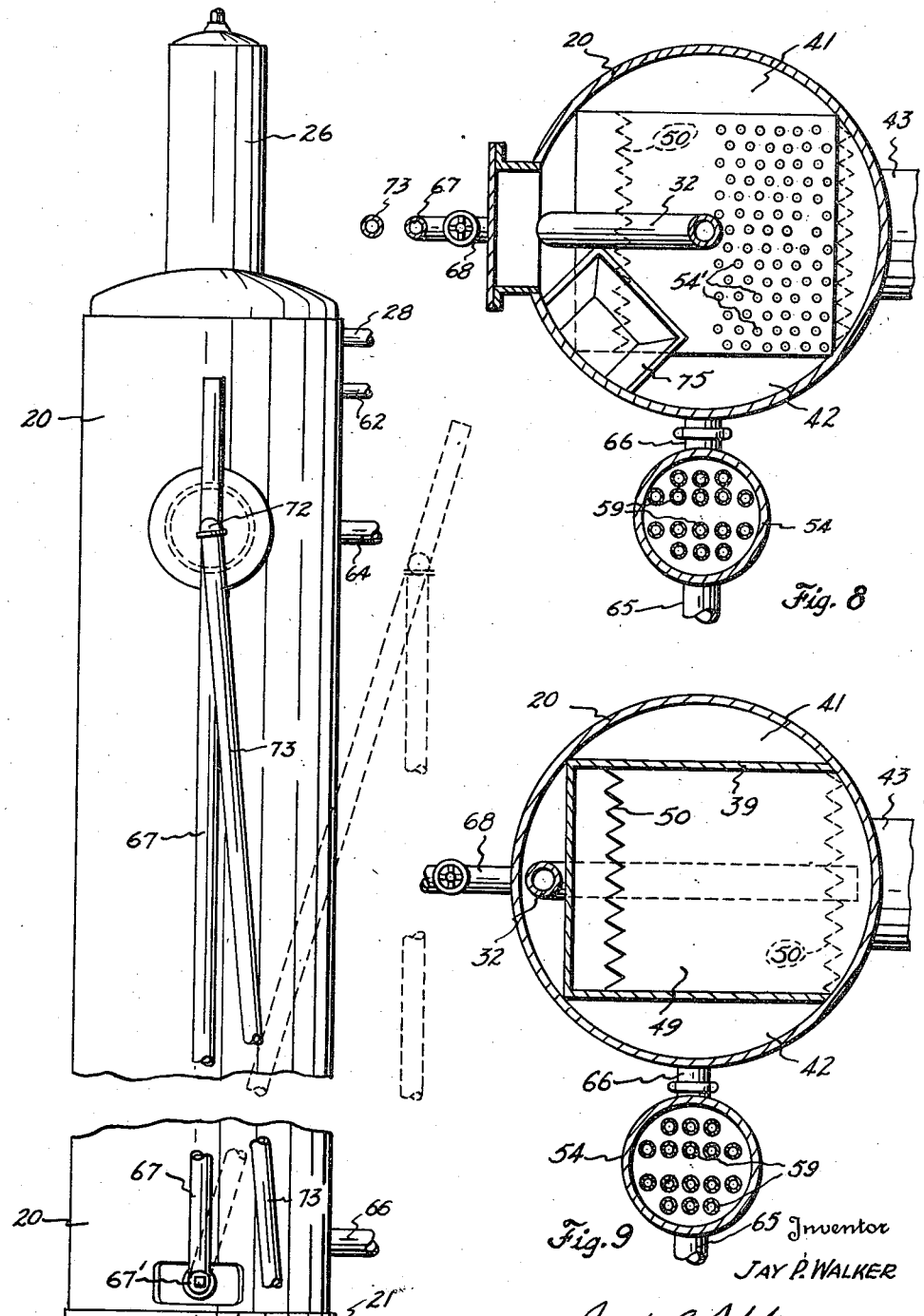
Figures 5, 6:
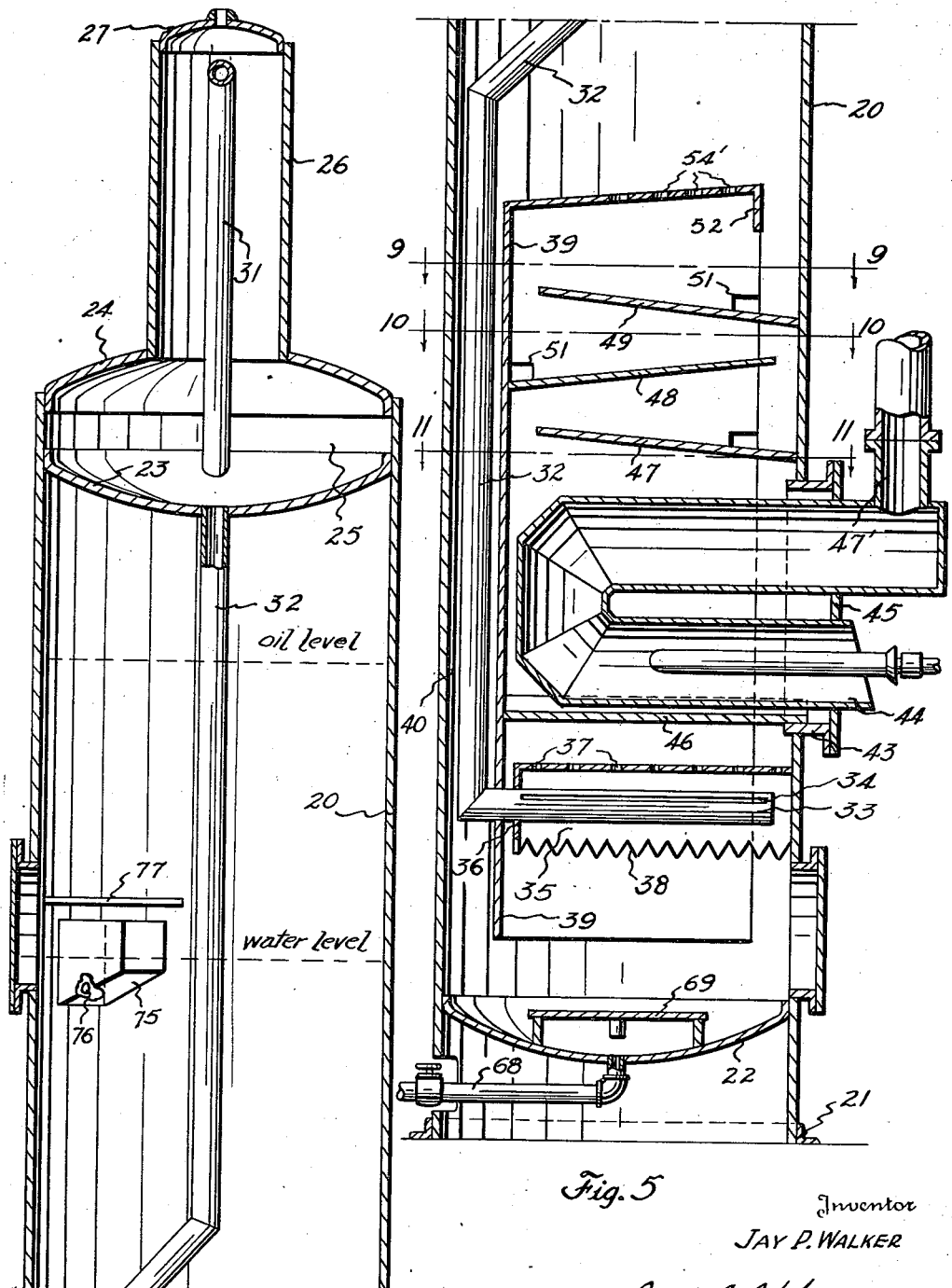
Figure 7:
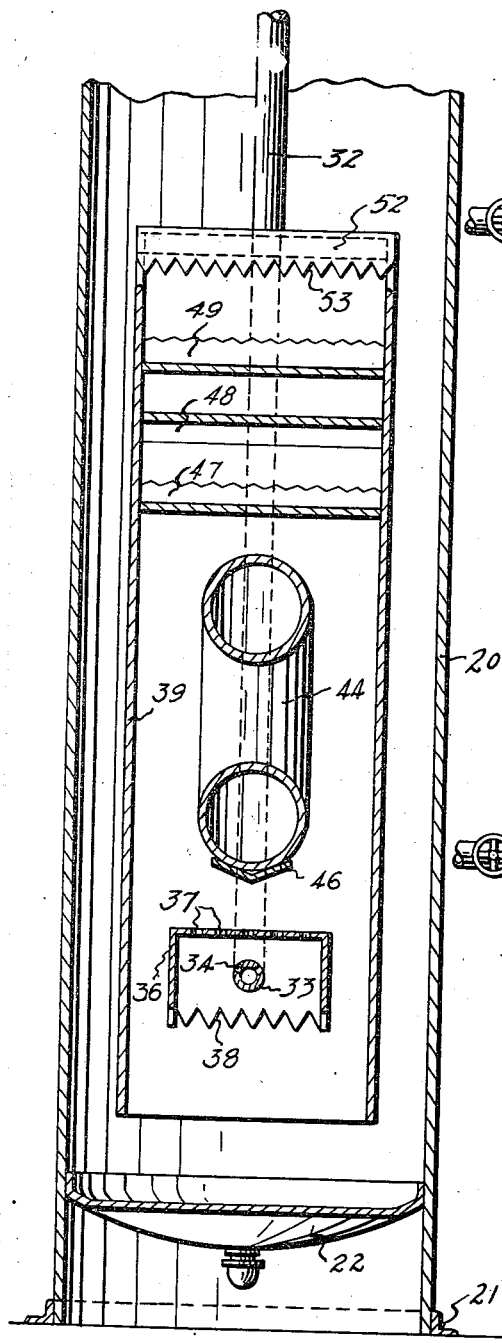
Figure 10:
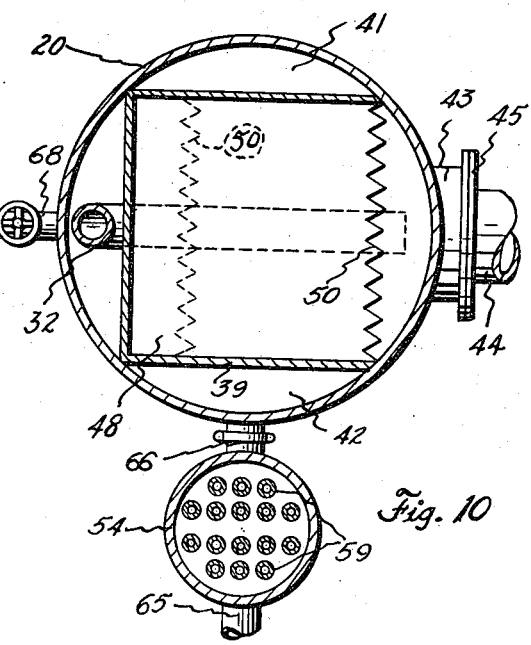
Figure 11:
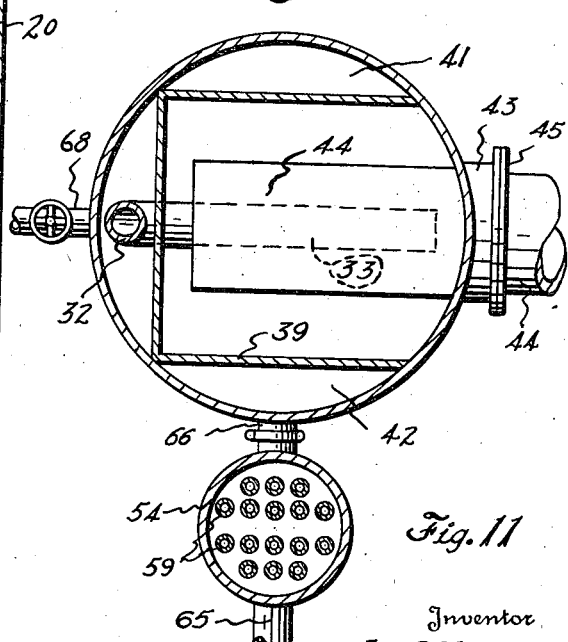
Figure 13:
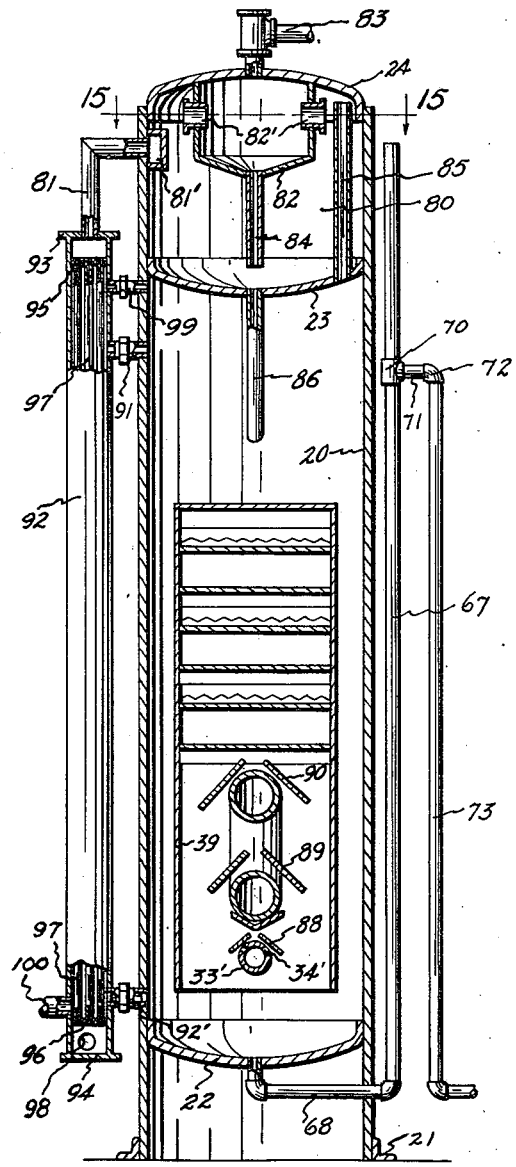
Figure 14:
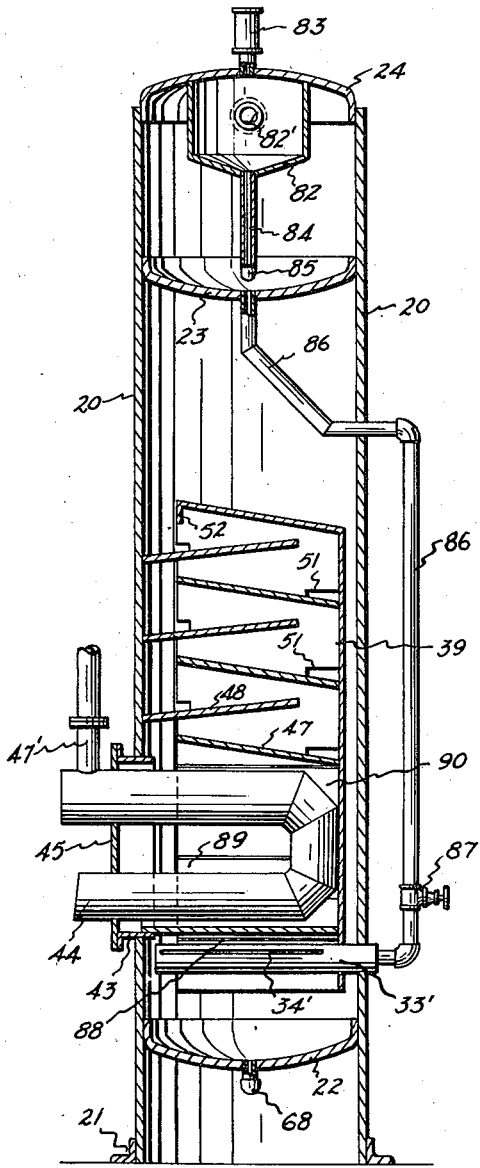

The invention will be more readily understood from a reading of the following specification and by reference to the accompanying drawings, in which an example of the invention is shown, and wherein:

Figure 1 is a view of a separator constructed in accordance with the invention, partly in section and partly in elevation, Figure 2 is a plan view of the same, Figure 3 is a horizontal, cross-sectional view taken on the line 3—3 of Figure 1, Figure 4 is an elevation of the separator in reverse to Figure 1, and the water level regulator, Figure 5 is an enlarged vertical, sectional view of the lower portion of the separator, Figure 6 is a similar view of the upper portion of the same, Figure 7 is a vertical sectional view taken at right angles to Figure 5, Figure 8 is a horizontal, cross-sectional view taken just above the water level of Figure 6, Figure 9 is a horizontal, cross-sectional view taken on the line 9—9 of Figure 5, Figure 10 is a horizontal, cross-sectional view taken on the line 10—10 of Figure 5, Figure 11 is a horizontal, cross-sectional view taken on the line 11—11 of Figure 5, Figure 12 is an elevation at right angles to Figure 4, Figure 13 is a transverse, vertical, sectional view of a slightly modified form of separator, Figure 14 is a similar view, taken at right angles to Figure 13, and Figure 15 is a horizontal, cross-sectional view, taken on the line 15—15 of Figure 13.

In the drawings, the numeral 20 designates an upright cylindrical tank of the usual construction such as is used in the building of separators. A particular form of the invention is shown in Figures 1 to 12, inclusive. The tank has a base 21 and a false bottom 22. A dished head 23 is secured in the upper end of the tank a short distance below the top of the tank. The upper end of the tank is closed by a crowned top 24. The members 23 and 24 seal off the upper portion of the tank and form a separating chamber 25.

A cylindrical column or tower 26 extends axially from the top 24 and is closed at its upper end by a cap 27. The lower end of the tower communicates with the chamber 25. A right angular inlet pipe 28 extends through the wall of the chamber and up into the tower as is shown in Figure 1. This particular species is illustrated in Figures 1 to 12, inclusive. The upper end of the pipe 28 discharges into a diverter box 29, whereby the influent is caused to take a circumferential course around the inner wall of the tower. The influent is scrubbed on the wall of the tower and the liquids pass downwardly into the chamber 25 while the gaseous fluids which are separated rise in the tower so as to enter the elbow 30 of the downwardly extending gas pipe 31. A suitable pressure valve (not shown) may be connected in the cap 27 or the opening therein may be sealed if desired. The pipe 31 is bent (as shown in Figure 1) and directed toward the wall of the tank. The lower end of this pipe extends through the head 23 so as to discharge the separated gases into the upper portion of the tank 20 below the chamber 25.

The liquids which have been primarily separated from the gas, but which contain some gas in solution, flow from the chamber 25 down through an axial discharge pipe 32. The pipe 32 extends from the bottom of the head 23 to the midportion of the tank where it is offset so as to extend down the tank in proximity to the wall thereof. At its lower end the pipe 32 is connected to one end of a horizontal nozzle 33 which extends diametrically across the tank, as is best shown in Figures 5 and 11. The nozzle 33 has one or more elongated slots 34 therein and these slots may be located wherever desired. In Figure 5 one of the slots is shown in the upper side of the nozzle. The mixture or emulsion composed of oil and water and substantially free from gas, is discharged from the nozzle into a receiving hood 35 which has a general rectangular shape. This hood extends from the wall of the tank inwardly so as to overhang the nozzle which enters through the end wall 36 of said hood, as is shown in Figure 5. The hood has a flat top which is preferably provided with perforations 37, while the lower edges of the vertical walls of the hood are provided with saw-teeth 38.

It is pointed out that the emulsion which is discharged into the hood from the nozzle will have a tendency to rise but it cannot escape except through the perforations 37 or downwardly and around the saw-teeth edges 38. There are several advantages in this method of introducing the emulsion into the tank. The hood 35 acts as a spreader and causes the emulsions to flow more or less horizontally or laterally from the nozzle. Because of the degasification in the tower the emulsion discharged from the nozzle will flow more or less unagitated. The saw-teeth and the perforations break up the emulsion into numerous small streams and the surface tension of the oil is thus reduced.

One of the features of the invention is to set up a thermo-syphon system, whereby the water which has been precipitated out of the oil is to a certain extent recirculated and reheated, as will be hereinafter explained. This system also provides to a degree insulation against outside temperatures. An upright housing 39 is disposed in the lower part of the tank. This housing is closed on three vertical sides and has its bottom open. The vertical edges along the open sides of the housing are attached to the inner wall of the tank 20, as is shown in Figures 8 to 11, inclusive. The hood 35 is contained within the lower portion of the housing a substantial distance above the open bottom thereof. The pipe 32 extends downwardly in a comparatively narrow vertical space 40 between one of the vertical walls of the housing and the wall of the tank and the nozzle extends through this wall for connection to the lower end of said pipe. As is shown in Figures 8 to 11, inclusive, there are also vertical travel spaces or passages 41 and 42 on each side of the housing 39.

The tank 20 is provided with a man-hole 43 just above the hood 35. A U-shaped tubular fire-box 44 is mounted in the cover 45 of the man-hole so as to extend into and across the tank, within the housing 39, as is best shown in Figures 5, 7 and 11. By removing the cover the fire box may be bodily removed from the tank. The lower leg of the box rests upon an angle bar 46 extending from the man-hole to the opposite wall of the housing as is shown in Figures 5 and 7. The lower leg of the fire-box is open, as is shown in Figure 5, to receive a suitable burner or heater. The upper leg of the fire-box is closed and carries a nipple 47' extending upwardly from the projecting end to which a suitable stack (not shown) may be attached. It is to be specifically noted that the invention is not to be limited to any particular kind of heat or heating elements, as any suitable means for heating may be employed.

Under operating conditions, the water level will stand some distance above the top of the housing 39, as is indicated in Figure 6, while the oil level will stand some distance above the water level, as is shown in Figure 1. It is to be understood that the water level may be below the top of the housing and such level is readily controlled by adjusting the stand pipe 67, hereinafter described. The emulsion which is discharged from the nozzle 33 will commingle with a body of heated water and will flow upwardly in the housing 39. If this emulsion has been preheated, it is obvious that less heat will be required in the housing than if said emulsion was not preheated.

One of the objects of the invention is to reduce the heat necessary to carry out the separating process. By reducing the heat, not only is there a saving in fuel cost, but there is a more important saving by preventing excessive losses of the lighter volatile gases, such as gasoline which pass off under excessive heat and are lost. The upwardly flowing emulsion passing through the zone of the fire-box 44 in the housing will be properly heated and will encounter a lower transverse baffle 47. This baffle overhangs the fire-box and terminates a short distance from the end wall of said housing. The baffle, being inclined slightly upwardly, will permit fluids and liquids to rise. A second inclined baffle 48 extends from the end wall of the housing so as to overhang the baffle 47 and terminates short of the tank wall, as is shown in Figure 10. A third inclined baffle 49 overhangs the baffles 48 and is similar to the baffle 47. It is obvious that these baffles, being disposed in staggered relation, may vary in number, according to the height of the housing. It is preferable to serrate the edges of the baffle by providing them with saw-teeth 50, as is shown in Figures 8, 9 and 10, whereby the emulsion is caused to flow in streams and the surface tension of the oil is further reduced.

By use of the inclined baffles 35, 47, 48 and 49 certain advantages are had. The emulsion or oil and water mixture which passes up through the housing 39 is virtually washed. The effectiveness of this washing operation is governed, to a large extent, by the length of the path through the water, which is travelled by the emulsion. If the baffles were not used, a tank more than fifty feet high would be required to secure efficient washing. An elongated travel path is highly desirable. The slightly inclined baffles 47, 48 and 49, while permitting an upward flow of emulsion, cause it to flow back and forth across the tank, which gives an opportunity for thorough washing and precipitation of the water.

The saw teeth 38 and 50 are very important as they assure a spreading of the emulsion and its division into numerous small streams. The baffles 47, 48 and 49 are shown in staggered relation, but they may be arranged in any manner which will elongate the travel path of the emulsion. The introduction of emulsion from the pipe 32 by way of the nozzle 33, below the baffles assures an upward flow around and between said baffles.

This washing operation has been found very effective and has reduced the amount of chemical used; and in some cases it may be eliminated entirely. While I have provided for heating the liquids within the tank, there are conditions in which the heating could be omitted from the tank. The emulsion might be heated in any suitable manner before introducing it into the tank.

Apertures 51 are provided in the side walls of the housing just above each baffle and adjacent their lower ends. These permit water which is separated from the emulsion and runs down the upper side of the baffle, to escape from the housing. These apertures are very important as they permit the water to drain from the upwardly moving fluid. It is highly desirable to take the separated water away from the rising oil as rapidly as possible. It is obvious that the water will be constantly seeking to flow to the bottom of the tank, while the oil will be constantly ascending. The top of the housing 39 is inclined upwardly and is preferably provided with a depending apron 52 having saw-teeth 53 at its lower end. A portion of the top, contiguous to the apron, may be provided with perforations 54'. The oil emulsion will be further separated and divided in streams by passing through the teeth 53 and upwardly through the perforations 54'. By the time the emulsion reaches the oil level all of the water will be separated therefrom and the upwardly flowing streams will be substantially entirely oil and some gas in solution.

It is pointed out that the water, which accumulates in the bottom of the tank, will have a lower temperature than the liquids passing between the baffles 47, 48 and 49 and in this zone of the tank, consequently a thermo-syphon action will be set up, whereby a circulation of water will be provided down through the passages 40, 41 and 42 and upwardly within the housing 39. This re-circulating of the water aids in heating the influent discharged from the nozzle 33, thus requiring less heat to be supplied by the fire-box 44. Further, the heated water passing downwardly around the housing and within the tank tends to insulate, by heat exchange, the fluids and liquids being heated within the housing 39, against temperatures outside of the tank, which temperatures may be quite low.

As before pointed out, it is highly desirable to reduce the amount of heat necessary to treat the emulsion within the tank. This may be largely accomplished by preheating the influent before it enters the tank, but it may also be accomplished through the use of thermo-syphon system and the elongation of the path through which the emulsion travels from the time it is discharged from the nozzle 33 until it reaches the upper portion of the tank. It is desirable to handle the influent at or near atmospheric pressure in order that the major part of the gas will rise from the oil emulsion as it enters the tank, thereby minimizing the loss of the highly volatile gases by the subsequent heat treatment. By first removing the major portion of the gas and then heating the emulsion and circulating it as described, the water may be effectively precipitated. Then by injecting the liquid contents or higher volatiles of the gas into the oil after the water has been removed, the oil is brought nearer to its original gravity and is not subjected to the great losses of valuable constituents, as in the common method now in use.

It is desirable to reduce the amount of chemical used in dehydrating the influent and if possible to do away with its use altogether. Such a result may be accomplished to a great extent by preheating the influent as it comes from the well and is about to enter the tank 20. A preheater and cooler 54 is mounted vertically of the tank 20, as is best shown in Figure 1. This device has a cylindrical shape and is closed at its upper end by a cap 55 and at its lower end by a cap 56. A head 57 is spaced a short distance below the cap 55, while a head 58 is spaced a short distance from the bottom cap 56. These heads are connected by vertical tubes 59. A vertical partition 60 extends from the cap 55 down through the head 57 into the space between the tubes. An influent pipe 61 enters the preheater and cooler between the cap 55 and the head 57. The partition 60 causes the influent to enter the tubes and flow down those on that side of said partition. The influent flowing down the tubes is discharged into the space below the head 58 and then flows upwardly through the tubes on the opposite side of the partition 60 and discharges into the space between the head 57 and the cap 55 on the opposite side of said partition. The inlet pipe 28 is connected with the head so that the influent which flows up the tube 59 is conducted to said pipe, and thence into the tank.

Just below the head 57 the preheater and cooler is connected with the gas space of the tank by a pipe 62 and the gas escape pipe 63 leads from the opposite side of the device. This permits the gas to escape from above the oil level and as it passes around and contacts with the tubes through which the cold influent enters, it is obvious that by reason of this passage and contact, the gas will be cooled before it enters the pipe 63, whereby the liquid contents are dropped out into the oil. On a line with the oil level in the tank 20 a pipe 64 extends to the device 54 and oil is constantly discharged into said device around the tubes 59. An oil outlet pipe 65 leads from the preheater and cooler 54 just above the head 58. From the foregoing it will be seen that the hot oil flowing out through the pipe 64 passes down through the preheater and cooler between the tubes 59 and by reason of heat exchange, the cold influent passing through said tubes is preheated and the hot oil is thereby cooled. The lower end of the preheater is supported from the tank by a dead ended pipe 66, there being no connection with the tank at this point, whereby fluid will flow thereinto.

The preheating of the influent is very important because it reduces the amount of chemical necessary to feed into the pipe 61, and in some instances the use of emulsion treating chemicals is entirely eliminated. However, where chemical is used, it has been found that a very efficient mixing of the chemical with the liquid is had, due to the presence of the gas in the incoming emulsion flowing through the heat exchange tubes, which gas because of the turbulence and agitation set up thereby, tends to more thoroughly admix the chemical with the emulsion. The influent is gradually heated and when it reaches the housing 39 it does not require very much more heat in order to carry out the water separation. By reducing the heat and then by releasing as much as possible of the gas, in the upper portion of the tank under the lowest possible pressure before passing the emulsion to the heating zone, much better results are obtained and the loss of the more valuable volatile constituents is prevented. Also, much better water precipitation is obtained.

In order to control the water level in the tank 20, an adjustable stand pipe 67 is employed. This pipe is connected with a T 67' at its lower end, which in turn is connected in the water discharge pipe 68 in such a manner as to swing. The pipe 68 leads from the bottom 22 of the tank. A baffle 69 may be mounted over the outlet to the pipe 68, as is shown in Figure 5. The outer end of the pipe 68 is plugged so that water will rise in the stand pipe to the same level as in the tank 20. A T 70 is connected in the pipe 67 and a short nipple 71 extends from this T and has an elbow 72 screwed onto its end. A discharge pipe 73 leads downwardly from the elbow and is suitably connected with a pit or other water conductor or discharge means. The water in the pipe 67 will be higher than the water level in the tank 20, due to the additional weight of the oil floating on the water. It will be seen that by swinging the pipe 67, the nipple 71 will be raised or lowered and thus the water level in the tank controlled. Of course, any other controlling means might be used.

In Figures 6 and 8, a catch-box 75 is shown mounted on the inner wall of the tank. This box has an open top which projects slightly above the water level and is intended to draw off deposits and settlements from the bottom of the body of oil which is floating on the water. A plug 76 is provided in the wall of the tank which may be removed for drawing off the settlement which has collected in said box. Just above the box is a horizontal baffle plate 77 which prevents the oil from channeling when settlement drops into said box. Any other means may be used for this purpose.

In using the separator, it is sometimes necessary to fill the tank to the water level with salt water. If natural salt water is not available then it is necessary to mix about two hundred and fifty pounds of salt to each one hundred barrels of water. However, it has been found that the method may be successfully performed by merely flowing the influent from the well into the tank to a level above the burner, or in providing any other liquid level, and then supplying heat. When the tank 20 has been filled to the proper level with salt water or other liquid, heat is supplied to the firebox 44 by a suitable burner. It may take several hours to heat the water or other liquid to the proper degree, which will ordinarily range from below one hundred to one hundred and seventy degrees or more Fahrenheit, according to the emulsion to be treated. As the water is heated it will circulate through the housing 39 and the passages 40, 41 and 42 (Figures 5, 8, 9, 10 and 11). When the water or other liquid has been sufficiently heated, the influent is admitted from the pipe 61 and caused to flow down the tubes 59 on the outer side of the partition 60. This influent will then flow up the tubes 59 and finally enter the pipe 28.

The influent which is discharged into the diverter 29 is carried around the inner wall of the tower 26 and thereby a considerable amount, possibly the majority of the gas, thus scrubbed out. However, some gas in solution will remain and the oil and water mixture will accumulate in the chamber 25 and flow down through the pipe 32. The gas which is separated will enter the elbow 30 and pass down through the pipe 31 .o the upper portion of the tank above the oil level and escape through the pipe 62 into the preheater and cooler 54, from which it will escape through the pipe 63. In passing through the device 54 the hot gases are cooled and this is necessary before they can drop out their condensable contents. When the influent is heated a portion thereof becomes gas, and when cooled this portion of the gas becomes liquid, usually gasoline; and this, when remixed with oil, raises the gravity thereof.

The oil and water mixture passing down the pipe 32 will be discharged from the nozzle 33 through the slot 34 into the hood 35. This oil and water mixture will flow upwardly into the housing 39 and the water and oil will thus be separated so that the oil which rises to the oil level will pass out through the pipe 64 into the preheater 54. This oil will be hot and in passing down and around the tubes 59 it will be cooled by the heat exchange, as hereinbefore set forth. The oil finally discharges through the pipe 65 and may be conducted to a suitable tank. In some cases, it has been found desirable to admix the cooled gas with the oil to restore the oil to approximately its original specific gravity.

The hot gases which rise from the hot oil will contact the bottom 23 of the chamber 25. The bottom 23 being much cooler because of the lower temperature of the liquids in said chamber, will cause the gases to condense and drop therefrom as liquids. These liquids, being condensed over the body of oil, will drop thereinto; thus building up the gravity of the oil.

After the process has started, considerable less heat will be required because of the hot oil passing through the preheater and the circulation of the liquids within the tank. The preliminary separation whereby the major portion of the gas is separated from the oil and water, makes it much more easy to precipitate the water and carry out the separation. It is obvious that the more the influent is heated the greater will be the expansion of the gas and therefore the greater the agitation. By keeping down the heat and increasing the travel path through the housing 39, there is less agitation and less expansion and consequently less loss of gaseous vapors. The water will, of course, gradually settle and pass off through the pipe 68. The dividing of the mixture into small streams by the saw-teeth 38 and 50, as well as by the perforations 35 and 54, greatly enhances the separation.

In Figures 13 to 15, I have shown another form of the invention which is probably more adaptable to carrying out the invention and it is believed that this form will probably come into wider use than the first form shown in Figures 1 to 12. In this form, the dished head 23 is spaced some distance from the crowned top 24 of the tank 20, whereby a comparatively large receiving chamber 80 is formed at the upper end of the tank.

The well influent is discharged through an inlet pipe 81, into a diverter box 81', whereby the influent is directed around and scrubbed on the inner wall of the chamber 80. This scrubbing action liberates the greater portion of the gas which gas passes upwardly and enters inlets 82' provided in an axial annular baffle 82 depending from the top 24. The gas then passes outwardly through a discharge pipe 83 provided in the top of the tank. A drain pipe 84 depends from the gas chamber 82 to conduct any liquid present in the chamber back into the chamber 80. An equalizing pipe 85 extends upwardly from the dished head 23, whereby a communication is established between the upper end of the chamber 80 and the tank 20 below the head 23.

The liquids which have been separated in the chamber 80 and which contain some gas in solution, are conducted from the chamber through an axial discharge pipe 86. The pipe 86 is offset so as to extend through the wall of the tank 20, and then extends downwardly on the outside of the tank. The lower end of the pipe is connected to one end of a horizontal discharge nozzle or pipe 33' which is disposed laterally within the tank similar to the nozzle 33 in the first form. The nozzle is provided with a plurality of openings 34', whereby the mixture from the conductor 86 is discharged into the lower end of the tank.

For controlling the flow from the chamber 80 to the nozzle 33', a valve 87 is connected in the conductor 86. By adjusting this valve, the flow of mixture to the nozzle may be readily varied. This arrangement is particularly advantageous when the well flow to the chamber 80 is uneven on account of heading or surging of the well flow. In such case, the valve may be properly adjusted and the chamber 80 becomes a surge or receiving chamber; thus, the uneven flow to this receiving chamber will not affect the flow from the discharge nozzle into the tank.

In this form, the hood 35 which overhangs the nozzle 33, is eliminated, and a pair of transverse baffles 88 are located one on each side of the nozzle 33'. These baffles are inclined upwardly toward each other, whereby their upper edges overhang the nozzle. By observing Figure 13, it will be seen that the flow from the nozzle 33', having a tendency to rise upwardly will strike the baffles 88 and pass upwardly therebetween into contact with the lower leg of the fire box 44. Similar baffles 89 and 90 are located to overhang each leg of the fire box, and the baffles act to direct the mixture discharging from the nozzle 33' into intimate contact with said fire box.

The baffles 88, 89, and 90 are disposed in the lower end of the housing 39, and after the mixture flows from between the baffles 90 overhanging the upper leg of the fire box, said mixture flows through the housing 39 and around the inclined staggered baffles therein. The action is the same as has been described, the water being precipitated from the oil within said housing. After the oil is separated it passes upwardly from beneath the housing and escapes from the tank 20 through the oil outlet pipe 91, which pipe is located some distance below the head 23, whereby a gas space is formed immediately below said head. It is noted that the pipe 91 acts as an overflow pipe which determines the oil level within the tank.

For preheating the influent before its passage to the chamber 80, a preheater and cooler 92 is mounted exteriorly of the tank 20, as is best shown in Figure 13. The device is shown as mounted vertically but may be horizontally, or otherwise disposed. This device has a cylindrical shape and is closed at its upper end by a cap 93 and at its lower end by a cap 94. A head 95 is spaced a short distance below the cap 93, while a head 96 is spaced a short distance from the bottom cap 94. These heads are connected by vertical tubes 97. An influent pipe 98 enters the preheater and cooler between the bottom cap 94 and bottom head 96, whereby the influent is introduced into the space below the head 96. Thus the well influent is caused to flow upwardly through the vertical tubes 97 and into the space between the upper head 95 and the top cap 93. The influent pipe 81 is connected in the top cap 93 whereby said pipe communicates with the space above the head 95. Therefore, it will be seen that the influent entering the pipe 98 flows through the vertical tubes 97 and finally into the pipe 81 which discharges into the diverter box 81' within the chamber 80.

Just below the upper head 95, the preheater and cooler is connected with the gas space of the tank below the head 23 by a pipe 99. It is noted that the pipe 99 passes through the wall of the preheater and cooler, whereby the gas is directed into the space around the vertical tubes 97. This permits the gas to escape from above the oil level within the tank and as this gas passes around in contact with the tubes through which the cold influent enters, it is obvious that by reason of this passage and contact, the gas will be cooled, whereby the liquid contents thereof are dropped out into the oil. The oil discharge pipe 91 is also connected in the wall of the preheater and cooler at a point below the pipe 99. Therefore, the oil from within the tank 20 will be conducted into the device 92 and the oil will flow around the vertical tubes 97. This oil will flow downwardly through the device and will escape from the lower end thereof through a pipe 100 which is connected in the lower end of the device just above the bottom head 96. From the foregoing, it will be seen that the hot oil flowing out through the pipe 91 passes down through the preheater and cooler between and around the tubes 97 and by reason of heat exchange, the cold influent passing through said tubes is preheated and the hot oil is thereby cooled. The lower end of the preheater is supported from the tank by a dead end pipe 92', there being no connection with the tank at this point.

The operation of this form is similar to the form shown in Figures 1 to 12. The influent is, of course, preheated in the preheater and cooler 92 and is then introduced into the chamber 80 at the upper end of the tank. Within this chamber the majority of the gas is separated from the influent, this gas passing into the gas chamber 82 and finally out through the pipe 83. The liquids separated in the chamber 80 flow downwardly through the pipe or conductor 86 to the nozzle 33' within the lower end of the tank. These liquids, having some gas in solution, are discharged from the nozzle 33' and directed upwardly into intimate contact with the fire box by the baffles 88, 89 and 90.

The mixture after passing around the fire box, flows upwardly through the housing 39 contacting the inclined staggered baffles therein. The action within the housing is exactly the same as in the first form and it is believed sufficient to say that the water is precipitated during the elongate travel of the mixture through the housing. After the oil escapes from beneath the top of the housing it flows upwardly and is finally discharged through the outlet pipe 91 into the preheating and cooling device 92. As has been explained, the hot oil passes around and between the vertical tubes 97, flowing downwardly through the device 92 to finally escape through a discharge pipe 100. The hot oil flowing around the tubes and the cold influent flowing upwardly through the tubes provides, by heat exchange, the preheating of the influent and the cooling of the oil.

The gas which is released from the mixture during the heating of said mixture, will, of course pass upwardly into the gas space between the oil level and the head 23. This gas will contact the comparatively cool bottom of the head 23 which will serve to cool said gas, whereby the liquid content of the gas is dropped back into the oil to raise the gravity of said oil. Of course, some of the gas will pass through the pipe 99 into the preheater and cooler 92 and will contact the vertical tubes 97 through which the cold influent is passing. The cool pipes 97 will serve to condense a portion of this gas. Some of the gas from the gas space will flow upwardly through the equalizing pipe 85 into the upper end of the receiving chamber 80. This gas will, of course, be comparatively hot and will contact the gas in the upper end of the chamber 80, which gas has been separated from the comparatively cold influent. The contact of the hot gas rising in the pipe 85 with the comparatively cool gas within the chamber 80 will serve to cool this hot gas and thus, the liquid content or higher volatiles present in the hot gas will be dropped into the liquid influent standing in the bottom of the chamber 80. With the above arrangement, it will be obvious that substantially all of the liquid content of the gas is recovered and is not permitted to escape through the gas pipe outlet 83. Therefore, the remixing of the higher volatiles or liquid content of the gas with the oil, as well as with the influent, serves to maintain the specific gravity of the oil.

What I claim and desire to secure by Letters Patent, is:

1. The method of dehydrating crude oil emulsions which includes, dividing the flowing emulsion into small streams and preheating prior to washing in water to liberate entrained gas, scrubbing the preheated emulsion to remove gas therefrom to produce a crude oil and water mixture substantially free from gas except gas in solution, maintaining a body of water at a substantially predetermined level to form a washing zone, discharging water from said body to substantially maintain said level, floating dehydrated oil upon said body of water to form an oil zone, heating said body of water, flowing said mixture from the gas separation step to the body of heated water for its initial washing, conducting the crude oil emulsion in a circuitous path upwardly through the washing zone of said body of heated water and thoroughly washing said emulsion, at the same time carrying off water from the washing zone at various elevations below the oil zone in said circuitous path to quickly remove water from the upwardly flowing emulsion and flowing the carried-off water downwardly through a segregated channel to obviate counter flow through said washing zone as well as to cool said segregated water, and also at the same time recirculating said segregated water concurrently with the mixture, whereby a thermo syphonic flow of the water is maintained for accelerating the circulation of said washing water and separation of the components of the mixture, cooling gases above the oil zone to precipitate the condensate into the oil to enrich the latter, and carrying dehydrated oil from the body of oil.

2. The method of dehydrating flowing oil well emulsions in the oil field which includes, continuously flowing an oil well emulsion from a well under flowing pressure through an elongate preheating step prior to washing in water and gradually heating said emulsion and liberating gas entrained therein, flowing the emulsion and gas concurrently through said step and for a period of time sufficient to liberate the gas, then continuing flowing the preheated emulsion and gas stream into an enlarged confined area and separating the liberated gas and additional entrained gas from said stream, whereby said stream is converted into a water and oil mixture in said area and gas is permanently separated from said mixture, carrying off the separated gas to free the mixture therefrom, continuing the flow of the preheated oil and water mixture into a body of hot water and completely washing said mixture in a single washing stage, by conducting said mixture in small dispersed streams upwardly through said body of hot water and continuously dividing the upwardly flowing streams into small dispersed streams at different elevations to break up the emulsion and separate the oil from the oil-well water, also diverting the continuous upward flow of the streams into a circuitous path through the body of hot water to prolong the travel thereof through said body to subject the oil and water mixture to a sufficient washing action to thoroughly break the emulsion droplets and free the oil-well water therefrom, collecting the dehydrated oil on top of the body of heated water, carrying off the dehydrated hot oil and conducting the same in a prolonged path contiguous to the inflowing emulsion to gradually heat the same, and carrying off the oil-well water precipitated from the oil and water mixture.

3. The method of dehydrating flowing oil well emulsions in the oil field which includes, continuously flowing an oil well emulsion from a well under flowing pressure and dividing it into numerous small streams and continuously and concurrently flowing said small streams through an elongate preheating step prior to washing in water and gradually heating said emulsion and liberating gas entrained therein, flowing the emulsion and gas concurrently through said step and for a period of time sufficient to liberate the gas, then continuing flowing the preheated emulsion and gas stream directly into an enlarged confined area and separating the liberated gas and additional entrained gas from said stream, whereby said stream is converted into a water and oil mixture in said area, continuing the flow of the preheated oil and water mixture into a body of hot water and conducting said mixture in small streams upwardly through said body of hot water and continuously dividing the upwardly flowing streams into small streams at different elevations to break up the emulsion and separate the oil from the oil-well water, also diverting the continuous upward flow of the streams into a circuitous path through the body of hot water to prolong the travel thereof through said body to subject the oil and water mixture to a sufficient washing action in a single stage to thoroughly break the emulsion droplets and free the oil-well water therefrom, collecting the dehydrated oil on top of the body of heated water, carrying off the dehydrated hot oil and conducting the same in a prolonged path contiguous to the inflowing emulsion to gradually heat the same, and carrying off the oil-well water precipitated from the oil and water mixture.

4. The method of dehydrating flowing oil well emulsions in the oil field which includes, continuously flowing an oil well emulsion from a well under flowing pressure through an elongate preheating step prior to washing in water and gradually heating said emulsion and liberating gas entrained therein, flowing the emulsion and gas concurrently through said step and for a period of time sufficient to liberate the gas, then continuing flowing the preheated emulsion and gas stream directly into an enlarged confined area and separating the liberated gas and additional entrained gas from said stream, whereby said stream is converted into a water and oil mixture in said area, continuing the flow of the preheated oil and water mixture into a body of hot water and conducting said mixture in small streams upwardly through said body of hot water and continuously dividing the upwardly flowing streams into small streams at different elevations to break up the emulsion and separate the oil from the oil-well water, also diverting the continuous upward flow of the streams into a circuitous path through the body of hot water to prolong the travel thereof through said body to subject the oil and water mixture to a sufficient washing action to thoroughly break the emulsion droplets and free the oil-well water therefrom, collecting the dehydrated oil on top of the body of heated water, condensing the gaseous vapors rising from the hot oil and precipitating the condensate into the hot oil, carrying off the dehydrated hot oil and conducting the same in a prolonged path contiguous to the inflowing emulsion to gradually heat the same, and carrying off the oil-well water precipitated from the oil and water mixture.

5. The method of dehydrating oil well emulsions which includes, flowing an oil well emulsion through a preheating step prior to washing in water for liberating gas and for initially heating said emulsion, then flowing the emulsion through a gas separating step to separate gas from the emulsion and produce a more stable mixture, then flowing the residual mixture upwardly through a body of heated water to wash the emulsified water from the said residual mixture, collecting the dehydrated oil in a body on top of the body of water, admixing relatively cool gases previously separated from the emulsion stream with hot gases arising from the body of oil to condense liquefiable fractions therefrom, further cooling said gases by heat exchange with the emulsion flowing from said gas separation step to condense additional liquefiable fractions, admixing the condensates from both gases with the dehydrated oil, carrying off water and maintaining a water level, and conducting the hot dehydrated oil through a segregated path in heat exchange relation with the flowing oil well emulsion to preheat the emulsion during said preheating step and to cool said oil.

6. The method of dehydrating in a single washing step oil well emulsions flowing from a well which includes, flowing a well stream including oil, gas and water from a well, separating gas from said stream to produce an oil and water mixture, interrupting the flowing oil and water mixture and providing a strata of relatively cool liquid, conducting the oil and water mixture from the liquid strata to a heating and washing zone, heating said mixture while flowing it through said heating zone, conducting said flowing mixture in a circuitous path through said zone to prolong its travel and more thoroughly wash said mixture to precipitate water from the oil, collecting the hot washed oil in a body below the strata of cool liquid, passing gaseous vapors arising from the hot oil into heat exchange relation with the relatively cool strata of liquid thereabove to cool such vapors and condense liquefiable fractions, admixing the condensates with the hot oil to enrich the same, carrying off the enriched hot oil, and carrying off the precipitated water washed from the oil and water mixture.

7. The steps in a method of dehydrating oil well emulsions flowing in a stream from the well which include, primarily separating gas from the flowing emulsion stream, washing the emulsion in a single stage by flowing the stream into a body of hot water, carrying off water from said body to maintain a constant washing zone, heating said body of water to promote washing of the emulsion, floating dehydrated oil on the body of water, carrying off oil from said body of oil to maintain a constant oil zone, conducting the stream which is flowed to the washing zone in a circuitous path upwardly through said washing zone and carrying off precipitated water at various elevations in the washing zone, conducting precipitated water to the body of hot water and flowing the same upwardly through said body of water to set up a thermo-syphonic recirculation of said precipitated water, and conducting the hot oil carried off from the oil zone in amplified heat exchange relation to the well stream prior to washing said stream in water and continuing such heat exchange only sufficiently to prepare said stream for complete washing in a single stage, whereby said steps may be carried out rapidly and economically.

8. The method of dehydrating in a single washing step crude oil well emulsions flowing from a well which includes, maintaining a body of hot water at a substantially predetermined level to form a washing zone, discharging water from said body to maintain said level, floating dehydrated oil upon said body of water to form an oil zone, heating said body of water and flowing the same to produce a thermo-syphonic flow in conjunction with flowing the emulsion to the body of heated water and discharging said emulsion into said body of water so that it flows upwardly therein in a multiplicity of flowing streams, together with further conducting the crude oil emulsion in a circuitous path upwardly through the washing zone of said body of heated water and successively dividing said emulsion into additional small streams for thoroughly washing the same, at the same time successively carrying off water from the washing zone at various elevations below the oil zone and in said circuitous path to quickly remove water from the upwardly flowing emulsion and also flowing the carried off water downwardly through a segregated channel to cool said water and for recirculating the same concurrently with the emulsion, and carrying off dehydrated oil from the body of oil.

9. The method of dehydrating oil well emulsions as set forth in claim 6 wherein the well stream is first conducted through a preheating step in which it is divided into a number of small concurrently flowing streams to more rapidly heat said stream to liberate gas, then conducting the preheated stream directly to the gas separating step, and the additional step of conducting the discharged washed hot oil in intimate heat exchange relation with the said small streams to carry out the preheating thereof, whereby the stream is preheated prior to washing in water to enable the washing to be done in a single step and without excessive heating.

10. In an emulsion treating apparatus, a tank, means in the upper portion of said tank defining a gas separating portion and a liquid accumulation chamber having a bottom for accumulating liquids therein, means for introducing an oil well emulsion into the gas separating portion and liquid accumulating chamber of the tank, means in said upper tank portion for separating gas from the emulsion to provide a more stable mixture which will more readily lend itself to washing, a conductor leading from the said chamber to the lower portion of said tank restricted to control the flow of liquids from said portion and maintain an accumulation of liquids on said bottom and within said chamber, means for discharging water from the tank at an elevated point for maintaining a body of water at a substantially constant level in the lower portion thereof, means for heating said body of water, means in the body of water for discharging the liquids from the conductor into the lower portion of said body of water, means in said body of water having elements at different elevations and transversely spaced from each other elongating the flow path and for successively dividing the upwardly flowing currents of the mixture into a multiplicity of small streams to thoroughly wash said mixture and to dehydrate the oil, means for discharging hot oil from the tank adjacent to and below the bottom of said chamber and for maintaining an oil level adjacent to and below said bottom, whereby hot vapors arising from said oil are caused to contact said bottom and are condensed and the condensates precipitate into the oil.

11. An emulsion treating apparatus as set forth in claim 10, and a heat exchanger connected with the washed oil discharge and the emulsion inlet means and arranged to conduct the emulsion in numerous small streams in heat exchange relation with the hot discharged oil.

12. In an emulsion treating apparatus, the combination of a tank having an emulsion inlet at its upper portion, a preheater having an inlet and a multiplicity of flow passages therethrough for receiving and conducting a well emulsion therethrough constructed to divide the influent into numerous concurrently flowing streams, whereby the emulsion is rapidly prepared for washing and gas is liberated, a conductor extending from the preheater to the inlet of the tank, a cross partition and a superstructure at the upper portion of the tank for dividing the tank thereabove into a gas separating zone, means in the gas separating zone for separating gas from the emulsion influent to form a substantially oil and water mixture which is received in the cooling zone and accumulated on said partition, means for conducting the oil and water mixture from the cooling zone restricted to control such flow so as to maintain an accumulation of oil and water in the cooling zone and having a discharge into the lower portion of the tank, means for discharging water from the tank and for maintaining a body of water at substantially a constant level therein, means for heating said water, means for conducting the oil and water mixture upwardly through said body of water in a transversely elongated path, whereby the mixture is heated and washed, means for discharging hot oil from the tank and maintaining an oil zone adjacent to and below the partition of the cooling zone, whereby hot vapors rising from the oil are caused to come into heat exchange relation with the said partition, a conductor connecting the hot oil discharge means with the preheater, means for conducting the hot oil through the preheater extraneously of the well emulsion in an amplified path and in heat exchange relation with the small streams concurrently flowing therethrough, and means for conducting the cooled oil from the preheater.

13. The method of dehydrating oil well emulsions in the oil field which includes, continuously flowing an oil well emulsion from a well under flowing pressure through an elongate preheating step prior to washing in water and gradually heating said emulsion and liberating gas entrained therein, flowing the emulsion and gas concurrently through said step and for a period of time sufficient to liberate the gas, then continuing flowing the preheated emulsion and gas stream directly into an enlarged confined area and rapidly separating the liberated gas and additional entrained gas from said stream, whereby said stream is converted into a water and oil mixture in said area and the gas is permanently separated from said mixture, continuing the flow of the preheated oil and water mixture into a body of hot water and completely washing said mixture in a single washing stage by conducting said mixture in small dispersed streams upwardly through said body of hot water and continuously dividing the upwardly flowing streams into small dispersed streams at different elevations to break up the emulsion and separate the oil from the oil-well water, also diverting the continuous upward flow of the streams into a circuitous path through the body of hot water to prolong the travel thereof through said body, withdrawing said separated water from the upwardly flowing stream at points in said path to subject the oil and water mixture to a sufficient washing action to thoroughly break the emulsion droplets and free the oil-well water therefrom, collecting the dehydrated oil on top of the body of heated water, carrying off the dehydrated hot oil and conducting the same in a prolonged path continuous to the inflowing emulsion to gradually heat the same, and carrying off the oil-well water precipitated from the oil and water mixture.

14. The method of dehydrating in a single washing stage flowing oil well emulsions in the oil fields which includes, conducting the oil well emulsion from the well under pressure, preheating the flowing well stream while continuously flowing the same, separating gas liberated during said preheating step and without contaminating said separated gas with oil or water to produce a water and oil mixture in which the oil includes some gas in solution, interrupting the flow of the water and oil mixture to create a cooling zone, flowing the water and oil mixture from said cooling zone upwardly through a body of hot water for a period of time sufficient to break up the emulsion globules, collecting the dehydrated oil on the body of water after final washing and releasing gas in solution from said oil, bringing the gaseous vapors arising from the oil into heat exchange relation with the cooling zone and condensing such vapors and precipitating the condensates into the hot oil to raise the gravity thereof, carrying off the enriched hot oil in heat exchange relation with the influent well stream to preheat the same and cool said oil, and carrying off the well water released from the emulsion.

JAY P. WALKER.